(12) United States Patent
Chen et al.

(10) Patent No.: US 11,509,346 B2
(45) Date of Patent: *Nov. 22, 2022

(54) SYSTEMS AND METHODS FOR DIE-TO-DIE COMMUNICATION

(71) Applicant: Taiwan Semiconductor Manufacturing Company Limited, Hsinchu (TW)

(72) Inventors: Huan-Neng Chen, Taichung (TW); Chewn-Pu Jou, Hsinchu (TW); Feng-Wei Kuo, Hsinchu County (TW); Lan-Chou Cho, Hsinchu (TW); William Wu Shen, Hsinchu (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/378,956

(22) Filed: Jul. 19, 2021

(65) Prior Publication Data

US 2021/0344374 A1 Nov. 4, 2021

Related U.S. Application Data

(60) Continuation of application No. 16/600,639, filed on Oct. 14, 2019, now Pat. No. 11,095,333, which is a
(Continued)

(51) Int. Cl.
*H04B 1/40* (2015.01)
*H04B 1/00* (2006.01)
(Continued)

(52) U.S. Cl.
CPC ............ *H04B 1/40* (2013.01); *H04B 1/0078* (2013.01); *H04L 1/0061* (2013.01); *H04L 1/1854* (2013.01); *H04L 2027/0022* (2013.01)

(58) Field of Classification Search
CPC ..... H04B 1/40; H04B 1/0078; H04L 27/0002; H04L 2027/0022; H04L 27/38; H04L 1/0061; H04L 27/365
See application file for complete search history.

(56) References Cited

U.S. PATENT DOCUMENTS 10,447,328 B2 * 10/2019 Chen ................. H04L 1/1854
11,095,333 B2 * 8/2021 Chen ..................... H04B 1/40
(Continued)

*Primary Examiner* — Guy J Lamarre
(74) *Attorney, Agent, or Firm* — Jones Day

(57) ABSTRACT

A transceiver disposed on a first die in a bidirectional differential die-to-die communication system is disclosed. The transceiver includes a transmission section configured to modulate a first data onto a carrier signal having a first frequency for transmission via a bidirectional differential transmission line; and a reception section configured to receive signals from the bidirectional differential transmission line, the reception section including a filter configured to pass frequencies within a first passband that includes a second frequency, the first frequency being outside of the first passband. According to some embodiments, the reception section is configured to receive, via the bidirectional differential transmission line, modulated data at the second frequency at a same time that the transmission section transmits the modulated data at the first frequency.

20 Claims, 17 Drawing Sheets

Related U.S. Application Data division of application No. 15/194,776, filed on Jun. 28, 2016, now Pat. No. 10,447,328.

(51) Int. Cl.
*H04L 1/00* (2006.01)
*H04L 1/18* (2006.01)
*H04L 27/00* (2006.01)

(56) References Cited

U.S. PATENT DOCUMENTS

| | | |
|---|---|---|
| 2013/0230080 A1 | 9/2013 | Gudem et al. |
| 2014/0170993 A1 | 6/2014 | Pescod et al. |
| 2015/0178092 A1 | 6/2015 | Mishra et al. |
| 2015/0215105 A1 | 7/2015 | Velitheri et al. |
| 2018/0191047 A1 | 7/2018 | Huang et al. |

* cited by examiner

SYSTEMS AND METHODS FOR DIE-TO-DIE COMMUNICATION

CROSS-REFERENCE TO RELATED APPLICATIONS

This application is a continuation application of U.S. patent application Ser. No. 16/600,639, filed Oct. 14, 2019, which is a divisional application of U.S. patent application Ser. No. 15/194,776, filed on Jun. 28, 2016, and this application is related to U.S. patent application Ser. No. 14/885,352, filed Oct. 16, 2015, entitled "Transceiver Group and Associated Router," and to U.S. patent application Ser. No. 14/921,205, filed Oct. 23, 2015, entitled "Integrated Circuit with Radio Frequency Interconnect," all of which are incorporated herein by reference in their entireties.

BACKGROUND

Die-to-die communications are used in a variety of electronics and computer systems. For example, computer systems commonly include a memory controller disposed on a first die (i.e., a first chip, a first integrated circuit) and a memory module disposed on a second die. The memory controller initiates a read operation by sending a read request to the memory module. The read request includes a request to read data from a particular address in memory. The memory module responds to the read request by transmitting both a data signal and a timing signal to the memory module. The transmission of the read request, data signal, and timing signal are examples of die-to-die communications. Similar die-to-die communications are used to complete write operations. Other die-to-die communications are used in a variety of electronics and computer systems.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
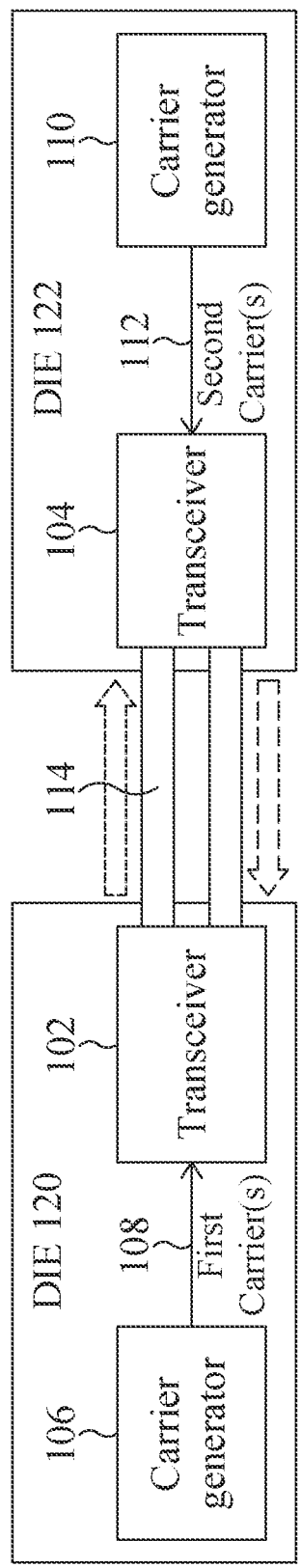
FIG. 1A depicts an example die-to-die communication system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1A depicts an example die-to-die communication system, in accordance with some embodiments. The system of FIG. 1A includes a first die 120 and a second die 122 coupled together via a single differential transmission line 114. A first transceiver 102 is disposed on the first die 120, and a second transceiver 104 is disposed on the second die 122. The first and second transceivers 102, 104 are configured to communicate via the differential transmission line 114, thus enabling die-to-die communication between the dies 120, 122.

In an example, the first and second dies 120, 122 comprise double data rate (DDR) devices and/or components of DDR devices. For instance, the first die 120 may comprise a memory controller or a portion thereof, and the second die 122 may comprise a memory module or a portion thereof. In reading data from the memory module and writing data to the memory module, data is exchanged between the first and second dies 120, 122. Such data includes, for instance, data signals and timing signals (e.g., DQ data signals and DQS data strobe signals). In other examples, the dies 120, 122 are not used in DDR devices and are instead used in a different electronics or computer system.

Figure 1B:
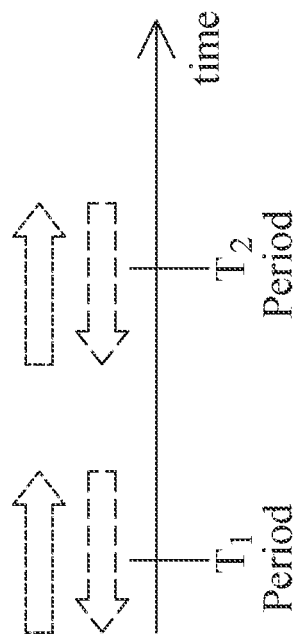
FIG. 1B depicts a timeline showing bidirectional data transmission between two dies, with both dies transmitting data simultaneously over a differential transmission line, in accordance with some embodiments.

In the example of FIG. 1A, bidirectional data transmission occurs between the first die 120 and the second die 122, with the dies 120, 122 being configured to transmit data simultaneously over the differential transmission line 114. To illustrate such bidirectional, simultaneous data transmission, reference is made to FIG. 1B. This figure depicts a timeline including two periods of time $T_1$ and $T_2$. In the first period of time $T_1$, data transmission occurs (i) from the first die 120 to the second die 122, and (ii) from the second die 122 to the first die 120, as illustrated in the figure. The data transmission is bidirectional because it is occurring in both directions (i.e., from the first die 120 to the second die 122, and vice versa), and it is simultaneous because the first and second transceivers 102, 104 are transmitting data over the transmission line 114 at the same time. Data transmission during the second time period $T_2$ is likewise bidirectional and simultaneous, as illustrated in FIG. 1B.

To achieve the bidirectional, simultaneous data transmission between the dies 120, 122, carrier partitioning is utilized. Under the carrier partitioning approach, the first transceiver 102 transmits data modulated onto a carrier signal 108 having a first frequency, and the second transceiver 104 transmits data modulated onto a carrier signal 112 having a second frequency. In the example of FIG. 1A, the carrier signals 108, 112 are generated by carrier generators 106, 110 disposed on the respective dies 120, 122. The first and second carrier signals 108, 112 are spaced far enough apart in frequency such that they do not interfere or overlap in frequency. Accordingly, the first and second transceivers 102, 104 can transmit data simultaneously over the transmission line 114 without significant interference that would make the communication difficult, thus enabling bidirectional, simultaneous data transmission between the dies 120, 122. This data transmission is achieved using a standard, single differential transmission line 114 between the dies 120, 122, which is in contrast to conventional approaches that require additional transmission lines to achieve bidirectional data transmission. Additional details of the carrier partitioning approach are described below.

Figure 2:
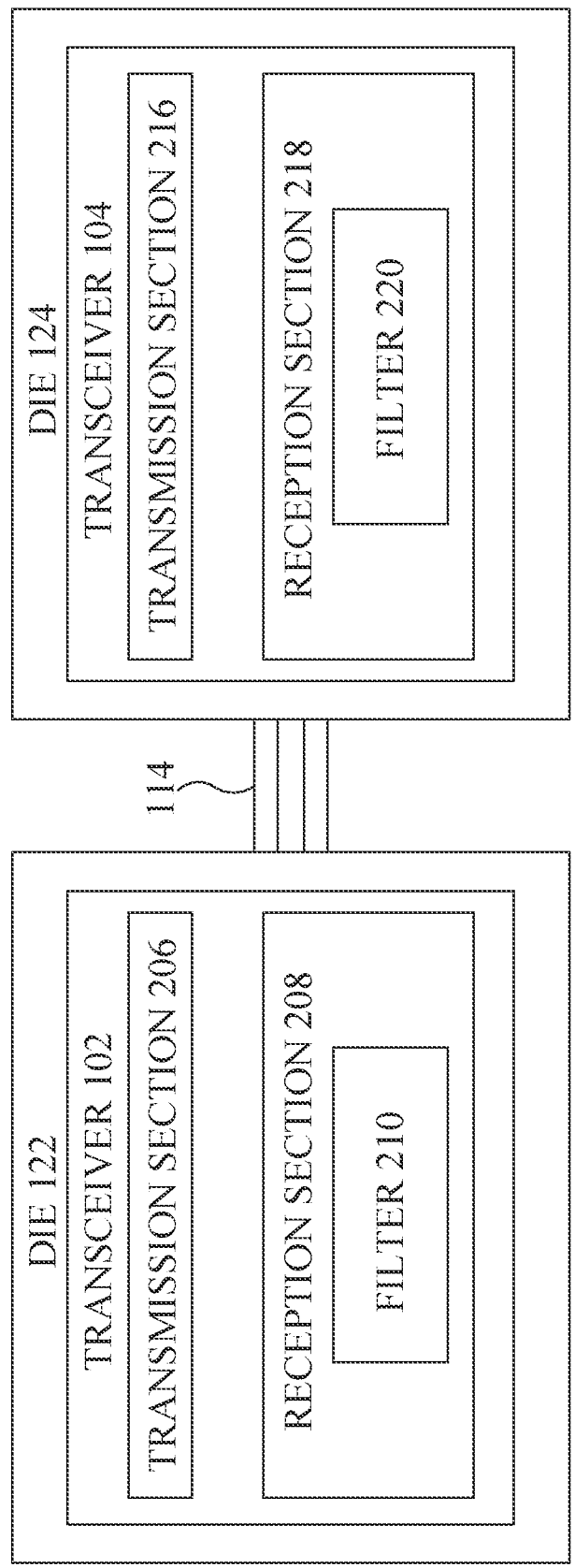
FIG. 2 depicts additional features of the example die-to-die communication system of FIG. 1A, in accordance with some embodiments.

To illustrate additional features of the transceivers 102, 104, reference is made to FIG. 2. As shown in this figure, the first transceiver 102 disposed on the first die 122 includes a transmission section 206 and a reception section 208. In examples, the transmission section 206 is configured to modulate first data onto a carrier signal having a first frequency for transmission via the differential transmission line 114. It is noted that in some examples, the transmission section 206 modulates data onto multiple different carrier signals having multiple different frequencies. This is described in further detail below with reference to FIGS. 3A-3D.

The reception section 208 of the first transceiver 102 is configured to receive signals from the differential transmission line 114. The reception section 208 includes a filter 210 that is configured to pass frequencies within a first passband while rejecting frequencies outside of the first passband. The first passband of the filter 210 includes a second frequency at which the second transceiver 104 transmits data, and the first frequency at which the first transceiver 102 transmits data is outside of the first passband. In this manner, the filter 210 is specifically configured to pass signals transmitted by the second transceiver 104, while rejecting signals at other frequencies. The filter 210 comprises a low-pass filter, a high-pass filter, or a bandpass filter, in examples. It is further noted that the filter 210 includes multiple filter sections in examples. For instance, the filter 210 includes two distinct bandpass filters having two different passbands in some examples. The use of multiple bandpass filters in a reception section is described below with reference to FIG. 3D.

The second transceiver 104 disposed on the second die 124 is configured to communicate with the first transceiver 102 via the differential transmission line 114. Similar to the first transceiver 102, the second transceiver 104 includes a transmission section 216 and a reception section 218. The transmission section 216 is configured to modulate second data onto a carrier signal having the aforementioned second frequency for transmission via the differential transmission line 114.

The reception section 218 of the second transceiver 104 is configured to receive signals from the differential transmission line 114 and includes a filter 220. The filter 220 is configured to pass frequencies within a second passband while rejecting frequencies outside of the second passband. The second passband of the filter 220 includes the first frequency at which the first transceiver 102 transmits data, and the second frequency at which the second transceiver 104 transmits data is outside of the second passband. In this manner, the filter 220 is specifically configured to pass signals transmitted by the first transceiver 102, while rejecting signals at other frequencies. In examples, the first passband of the filter 210 and the second passband of the filter 220 are non-overlapping. Like the filter 210, the filter 220 of the reception section 218 comprises a low-pass filter, a high-pass filter, or a bandpass filter, in examples. The first and second frequencies utilized by the respective transceivers 102, 104 are radio frequencies, in examples, such that the transceivers 102, 104 may be characterized as radio frequency (RF) transceivers.

The data transmissions at the different first and second frequencies and the selective filters 210, 220 implement a carrier partitioning system. Specifically, the transmission section 206 of the first transceiver 102 transmits data modulated onto the carrier signal having the first frequency, and the transmission section 216 of the second transceiver 104 transmits data modulated onto the carrier signal having the second frequency. The first and second frequencies of the respective carrier signals are spaced far enough apart in frequency such that they do not interfere or overlap in frequency, thus enabling the first and second transceivers 102, 104 to transmit data simultaneously over the transmission line 114 without significant interference that would make the communication difficult, in a bidirectional manner. The filter 210 is specifically tuned to pass signals having the second frequency, and the filter 220 is likewise tuned to pass signals having the first frequency. As noted above, the simultaneous, bidirectional data transmission is achieved using a standard, single differential transmission line and does not utilize additional transmission lines.

Figure 3A:
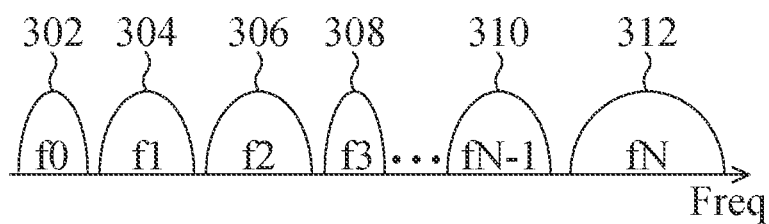
FIGS. 3A-3D illustrate the use of carrier partitioning for achieving bidirectional, simultaneous data transmission between two dies, in accordance with some embodiments.
Figure 3B:
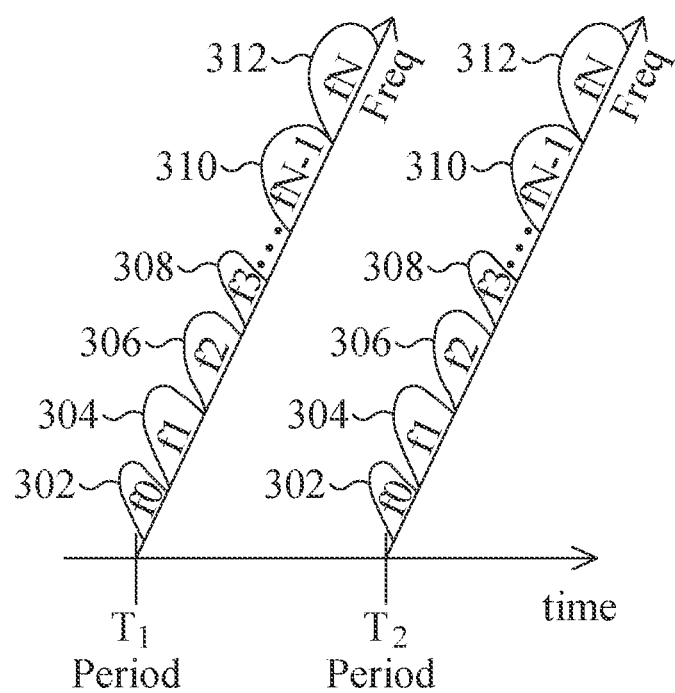

To illustrate further aspects of the carrier partitioning approach, reference is made to FIGS. 3A-3D. As described above, the carrier partitioning approach utilizes multiple non-interfering, non-overlapping frequencies for simultaneous, bidirectional transmission between two dies. Although the example of FIG. 2 described the transmission of data at first and second frequencies by the respective transceivers 102, 104, in other examples, more than two frequencies are used. For example, FIG. 3A depicts transmission of data at N frequencies 302-312, where N is greater than two. FIG. 3B illustrates that during a given period of time, data at the N different frequencies 302-312 are carried simultaneously via the single differential transmission line.

Figure 3C:
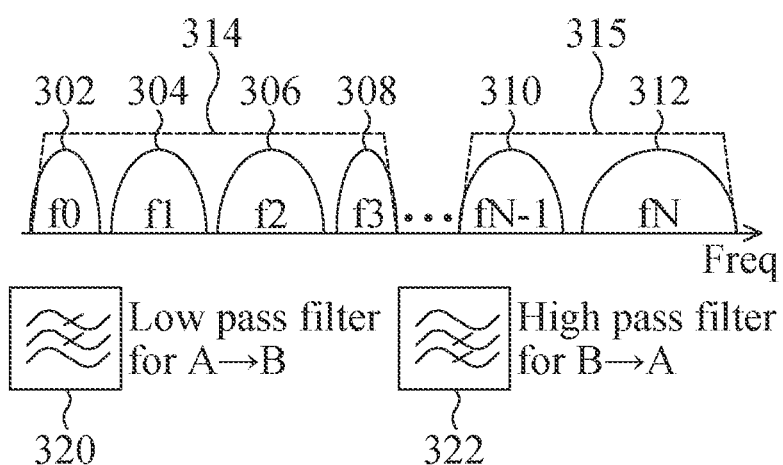

Under approaches of the instant disclosure, a first transceiver transmits data at a first subset of frequencies of the N frequencies 302-312, and a second transceiver transmits data at a second subset of frequencies of the N frequencies 302-312. To illustrate this, reference is made to FIG. 3C. In the example of FIG. 3C, a first transceiver "A" transmits data modulated onto carrier signals having the frequencies 302, 304, 306, 308. A second transceiver "B" transmits data modulated onto carrier signals having the frequencies 310, 312. To receive the data transmitted by the first transceiver A, a receiver of the second transceiver B utilizes a low-pass filter 320 with a passband 314. As shown in the figure, the passband 314 includes the frequencies 302, 304, 306, 308 at which the first transceiver A transmits data. Likewise, to receive the data transmitted by the second transceiver B, a receiver of the first transceiver A utilizes a high-pass filter 322 with a passband 315. The passband 315 includes the frequencies 310, 312 at which the second transceiver B transmits data. The passbands 314, 315 are non-overlapping, as illustrated in the figure.

Figure 3D:
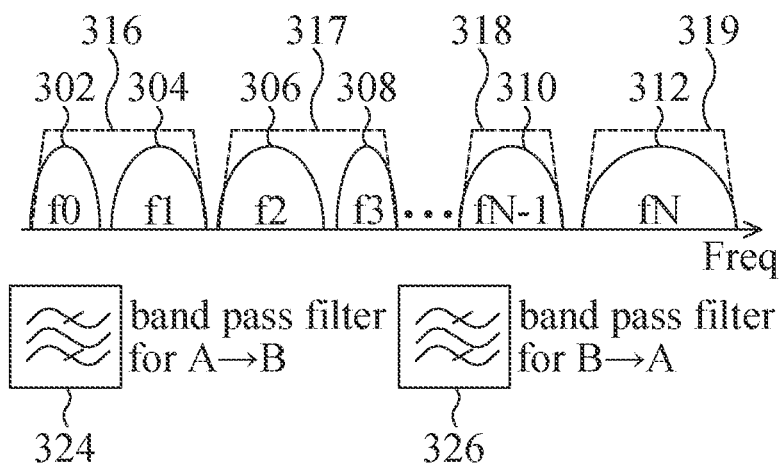

In the example FIG. 3D, the first transceiver A transmits data modulated onto carrier signals having the frequencies 302, 304, 310. The second transceiver B transmits data modulated onto carrier signals having the frequencies 306, 308, 312. To receive the data transmitted by the first transceiver A, the receiver of the second transceiver B utilizes a bandpass filter 324 with passbands 316, 318. As shown in the figure, the passbands 316, 318 include the frequencies 302, 304, 310 at which the first transceiver A transmits data. Likewise, to receive the data transmitted by the second transceiver B, the receiver of the first transceiver A utilizes a bandpass filter 326 with passbands 317, 319. The passbands 317, 319 include the frequencies 306, 308, 312 at which the second transceiver B transmits data. The passbands 316-319 are non-overlapping, as illustrated in the figure.

In systems utilizing die-to-die communications, error control techniques are commonly used to detect and/or correct errors in data received via a transmission channel. For instance, error detection techniques are used to detect errors caused by noise or other impairments during transmission over the channel. Error correction techniques are used to detect errors and reconstruct the original, error-free data. Under the approaches of the instant disclosure, the use of simultaneous, bidirectional data transmission between first and second dies enables error detection and/or correction to be performed in a more efficient manner.

Figure 4:
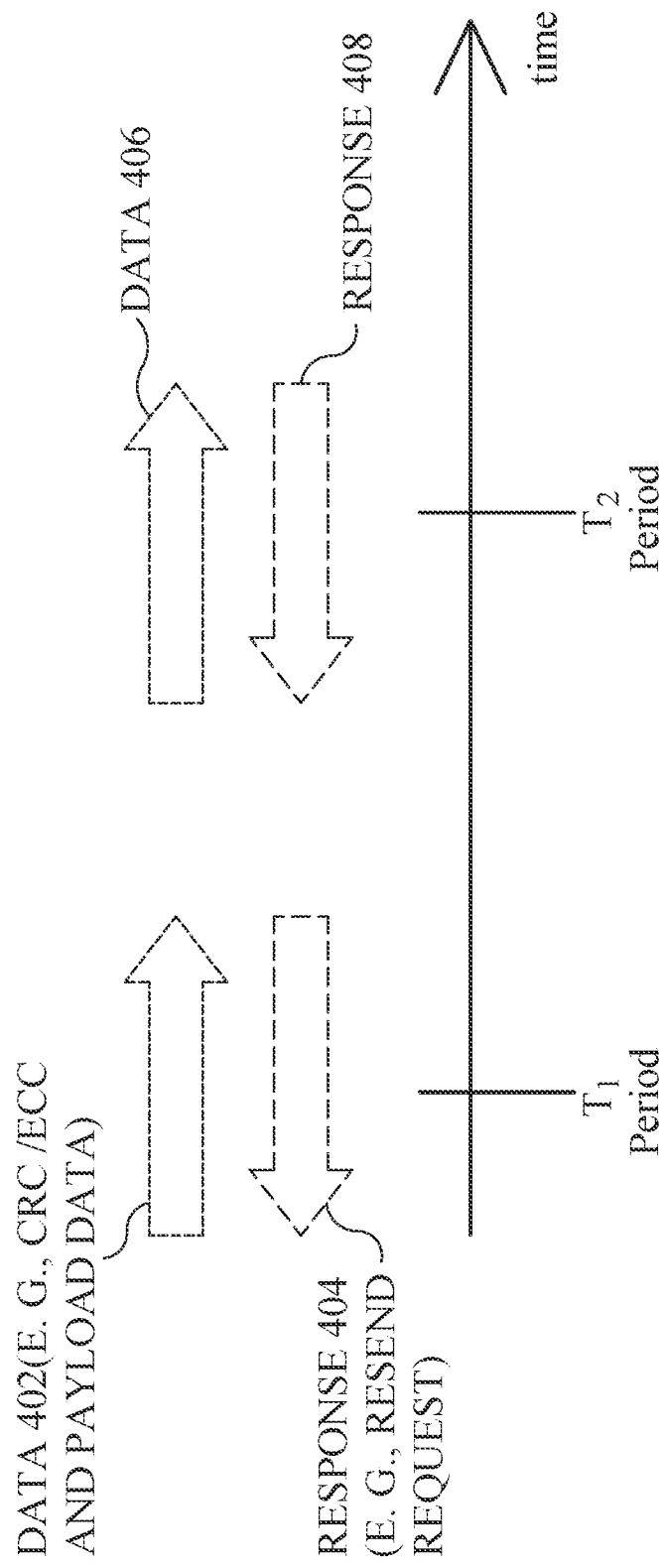
FIG. 4 depicts an example timeline showing (i) transmission of error detection or correction codes from a first die to a second die, and (ii) transmission of a response from the second die to the first die, where both transmissions occur within a single time period, in accordance with some embodiments.

To illustrate the improvements to error detection and/or correction enabled by the approaches of the instant disclosure, reference is made to FIG. 4. This figure depicts an example timeline showing two time periods $T_1$ and $T_2$. In a first time period $T_1$, a first transceiver disposed on a first die transmits data 402 to a second transceiver disposed on a second die via a differential transmission line. The data 402 includes error detection codes and/or error correction codes (e.g., CRC codes and/or ECC codes known to those of ordinary skill in the art), in examples. The data 402 further includes payload data. In examples, the transmission of the data 402 is via a frame having a predetermined data structure (e.g., a data structure having a preamble, header, command bits, payload data, and error detection/correction code, etc.).

Upon receipt of the error detection code and/or error correction code of the data 402, the second transceiver is configured to perform a check to determine if there is an error in the received data 402. If such an error is detected, the second transceiver is configured to transmit a response 404 to the first transceiver. In examples, the response 404 includes a "resend request," which requests that the first transceiver retransmit the data 402.

As shown in FIG. 4, the second transceiver transmits the response 404 during the first time period $T_1$, contemporaneously with the first transceiver's transmission of the data 402. The simultaneous, bidirectional data transmission between the first and second transceivers thus enables the second transceiver to (i) perform the error check, and (ii) transmit the resend request or other response to the first transceiver immediately upon detection of an error. In examples, the resend request or other response is transmitted contemporaneously with the first transceiver's transmission of the payload data. Upon reception of the resend request, the first transceiver can discontinue its transmission of the data 402 and begin resending the data 402, in accordance with the resend request.

In the second time period $T_2$ of FIG. 4, there is likewise a contemporaneous transmission of (i) data 406 from the first transceiver to the second transceiver, and (ii) a resend request 408 from the second transceiver to the first transceiver. The simultaneous, bidirectional data transmission provided under the approaches of the instant disclosure thus enables the second transceiver to respond to the first transceiver immediately upon detection of an error. This is in contrast to conventional die-to-die communication systems that do not utilize simultaneous, bidirectional communication.

In such conventional systems, data transmission between first and second transceivers disposed on respective first and second dies occurs according to a predetermined schedule. Thus, for example, during a first time period of the predetermined schedule, the first transceiver transmits data (e.g., error detection codes and/or error correction codes and payload data, etc.). An entirety of this data is transmitted, regardless of whether the second transceiver detects an error in the received data. This is because the schedule is fixed, and the second transceiver is not able to respond to the first transceiver with an indication of the error during the first time period. During a second time period of the predetermined schedule that follows the first time period, the second transceiver is able to respond to the first transceiver (e.g., with a resend request or other response). The conventional system is inefficient because it requires the second transceiver to wait until the second time period to transmit the resend request. The first transceiver's continued transmission of the data despite the error wastes bandwidth and time because the transmitted data is unusable and must be retransmitted during a subsequent time period.

In contrast to these conventional systems, under the approaches of the instant disclosure, a fixed schedule is not used, and the second transceiver is able to respond to the first transceiver immediately upon detection of an error. As noted above, the transmission of the resend request can occur contemporaneously with the transmission of the payload data or other data from the first transceiver to the second transceiver. This enables the first transceiver to receive the resend request and discontinue transmission of the data immediately. In contrast to the conventional systems, the first transceiver need not continue transmitting data until the end of a fixed time period. After discontinuing the transmission of the data having the error, the first transceiver can then begin retransmission of the data.

Figure 5A:
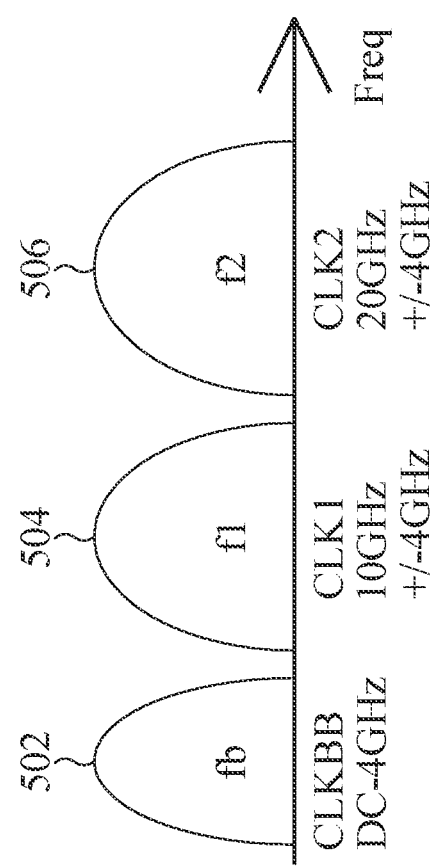
FIGS. 5A-5J depict features of an example die-to-die communication system, in accordance with some embodiments.

FIGS. 5A-5J depict features of an example die-to-die communication system, in accordance with some embodiments. In the example die-to-die communication system of FIGS. 5A-5J, a baseband frequency 502 and carrier frequencies 504, 506 are utilized. As shown in FIG. 5A, the baseband frequency 502 is within a frequency range of 0 Hz (DC)-4 GHz. The carrier frequency f1 504 has a frequency of 10 GHz+/−4 GHz, and the carrier frequency f2 506 has a frequency of 20 GHz+/−4 GHz. The frequencies 502, 504, 506 are spaced far enough apart in frequency such that they do not interfere or overlap. In FIGS. 5B, 5C, 5E, 5G, and 5I, the baseband frequency 502 is labeled as "CLKBB," the carrier frequency f1 504 is labeled as "CLK1," and the carrier frequency f2 506 is labeled as "CLK2."

Figure 5B:
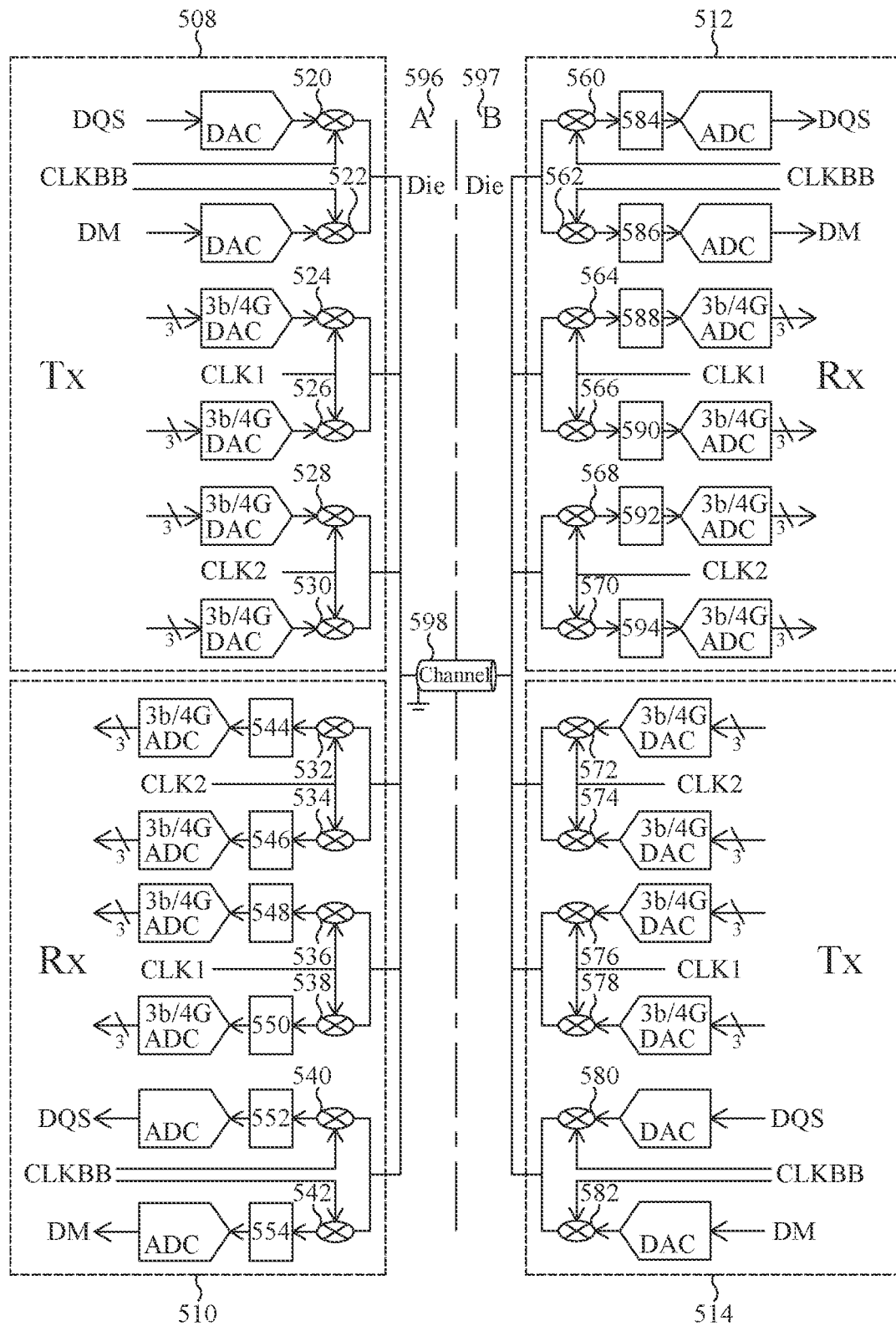
Figure 5C:
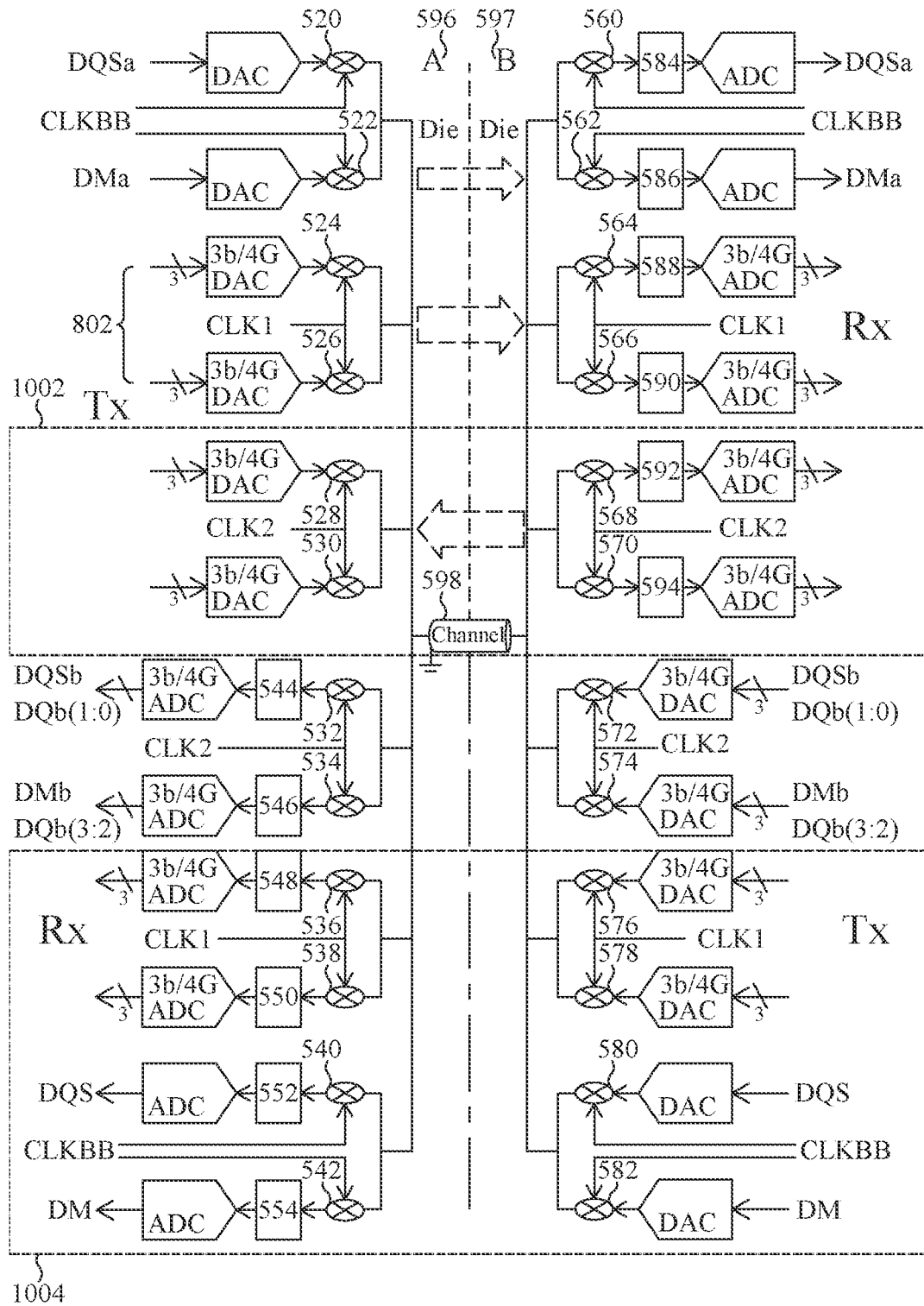

FIG. 5B depicts a first die 596 including a first transceiver and a second die 597 including a second transceiver. The first transceiver includes a transmission section 508 and a reception section 510, and the second transceiver likewise includes a transmission section 514 and a reception section 512. The transmission section 508 includes multiple digital-to-analog converters (DACs) for converting received digital data to analog data for transmission over a differential transmission line 598 (e.g., channel). The transmission section 508 further includes modulators 520, 522, 524, 526, 528, 530 for modulating analog data received from respective DACs onto carrier signals. Thus, for example, a first DAC shown in the figure is configured to receive digital timing data (labeled "DQS") and convert this data into a first analog signal, and the modulator 520 is configured to modulate the first analog signal onto a carrier signal having the baseband frequency 502. Likewise, a second DAC is configured to receive digital mask data (labeled "DM") and convert this data into a second analog signal, and the modulator 522 is configured to modulate the second analog signal onto a carrier signal having the baseband frequency 502. DQS and DM data are commonly used, for instance, in DDR devices, and such data are known to those of ordinary skill in the art.

In the transmission section 508, the DACs labeled "3b/4G" are each configured to receive 3 bits of data, as indicated by the "3b" notation. The "4G" notation indicates that each bit can be transmitted at a data rate of 4 Gbps, as explained in further detail below. These DACs are further configured to convert the received digital data into analog data, and the modulators 524, 526, 528, 530 are configured to modulate the analog data onto carrier signals having the carrier frequencies 504, 506. Specifically, as shown in the figure, the modulators 524, 526 receive the carrier frequency 504 (labeled "CLK1"), such that the modulators 524, 526 are configured to modulate received analog data onto carrier signals having the carrier frequency 504. The modulators 528, 530 receive the carrier frequency 506 (labeled "CLK2"), such that the modulators 528, 530 are configured to modulate received analog data onto carrier signals having the carrier frequency 506. The transmission section 508 is coupled to the differential transmission line 598 and configured to transmit modulated data over the transmission line 598.

The transmission section 514 disposed on the second die 597 includes components that are similar to those of the transmission section 508. These components include DACs and modulators 572, 574, 576, 578, 580, 582. These components are configured to perform functions similar to those described above with reference to the transmission section 508. In examples, the modulators of the transmission sections 508, 514 implement quadrature amplitude modulation (QAM) modulation or another modulation technique known to those of ordinary skill in the art. Under the QAM modulation technique, I- and Q-phases of a carrier frequency can be used for data transmission. Thus, for example, in the transmission section 508, the modulator 524 receives an I-phase of the carrier frequency 504, and the modulator 526 receives a Q-phase of the carrier frequency 504. The I- and Q-phases are out of phase with each other by 90° and may thus be referred to as quadrature carriers or quadrature components. Three bits of data can be transmitted via the I-phase, and three bits of data can be transmitted via the Q-phase. Likewise, the modulator 528 receives an I-phase of the carrier frequency 506, and the modulator 530 receives a Q-phase of the carrier frequency 506.

The reception section 510 disposed on the first die 596 includes demodulators 532, 534, 536, 538, 540, 542 and filters 544, 546, 548, 550, 552, 554 configured for use in recovering the information content from received modulated carrier signals. Each of the filters 544, 546, 548, 550, 552, 554 is configured to pass frequencies within a particular passband while rejecting frequencies outside of the passband. Specifically, the filters 544, 546 are configured to pass data transmitted at the carrier frequency 506, the filters 548, 550 are configured to pass data transmitted at the carrier frequency 504, and the filters 552, 554 are configured to pass data transmitted at the baseband frequency 502. Analog data that passes through the filters are received at respective analog-to-digital converters (ADCs). The ADCs are configured to convert the analog data into digital data, thus enabling the original digital data that was transmitted to be recovered. Thus, for example, digital timing data (labeled "DQS") and digital mask data (labeled "DM") transmitted by the transmission section 514 are output by ADCs of the reception section 510, as shown in the figure. Likewise, digital data bits transmitted by the transmission section 514 are output by the ADCs labeled "3b/4G." The "3b" notation indicates that each of these ADCs outputs 3 bits of digital data, and the "4G" notation indicates that the transmission section 514 transmitted each bit of this data at a data rate of 4 Gbps, as explained in further detail below.

The reception section 512 disposed on the second die 597 includes components that are similar to those of the reception section 510. These components include ADCs, demodulators 560, 562, 564, 566, 568, 570, and filters 584, 586, 588, 590, 592, 594. These components are configured to perform functions similar to those described above with reference to the reception section 510. In examples, the demodulators of the reception sections 510, 512 implement QAM demodulation techniques or other demodulation techniques. As noted above, under the QAM modulation technique, I- and Q-phases of a carrier frequency can be used for data transmission. Thus, for example, in the reception section 510, the demodulator 532 receives an I-phase of the carrier frequency 506, and the demodulator 534 receives a Q-phase of the carrier frequency 506. The demodulators 532, 534 utilize the respective I- and Q-phases in demodulating received signals. Likewise, the demodulator 536 receives an I-phase of the carrier frequency 504, and the demodulator 538 receives a Q-phase of the carrier frequency 504.

The example die-to-die communication system of FIG. 5B is configured to be operated in at least four different modes. These modes include two "normal" modes and two "burst" modes. To illustrate a first normal mode, reference is made to FIG. 5C. In this mode, the transmission section of the first die 596 is configured to transmit six bits of data 802 at the carrier frequency 504 (labeled "CLK1"). The transmission section transmits each of the six bits of data 802 at a data rate of 4 Gbps, thus enabling a total data rate of 24 Gbps in transmitting this data from the first die 596 to the second die 597. In the first normal mode, the transmission section of the first die 596 is further configured to transmit a timing signal DQSa and a data mask DMa at the baseband frequency 502 (labeled "CLKBB"). The reception section of the second die 597 utilizes the demodulators 560, 562, 564, 566 and filters 584, 586, 588, 590 to recover the six bits of data 802, the timing signal DQSa, and the data mask DMa.

Further, in the first normal mode, the transmission section of the second die 597 is configured to transmit a 1-bit timing signal DQSb, a 1-bit data mask DMb, and four bits of data DQb(1:0) and DQb(3:2) at the carrier frequency 506 (labeled "CLK2"). In an example, the four bits of data DQb (1:0) and DQb(3:2) comprise a resend request (e.g., generated after an error is detected in received data) or another response to the six bits of data 802 recovered in the reception section of the second die 597. In examples, error checking is performed on data received at the reception section of the second die 597, and the four bits of data DQb(1:0) and DQb(3:2) comprise a response to the first die 596 that is based on the error checking (e.g., a resend request, etc.). The transmission section of the second die 597 transmits each of the six bits (i.e., the 1-bit timing signal DQSb, the 1-bit data mask DMb, and the four bits of data DQb(1:0) and DQb(3: 2)) at a data rate of 1.333 Gbps, thus enabling a total data rate of 8 Gbps in transmitting this data from the second die 597 to the first die 596. The reception section of the first die 596 utilizes the demodulators 532, 534 and filters 544, 546 to recover the 1-bit timing signal DQSb, the 1-bit data mask DMb, and the four bits of data DQb(1:0) and DQb(3:2).

Figure 5D:
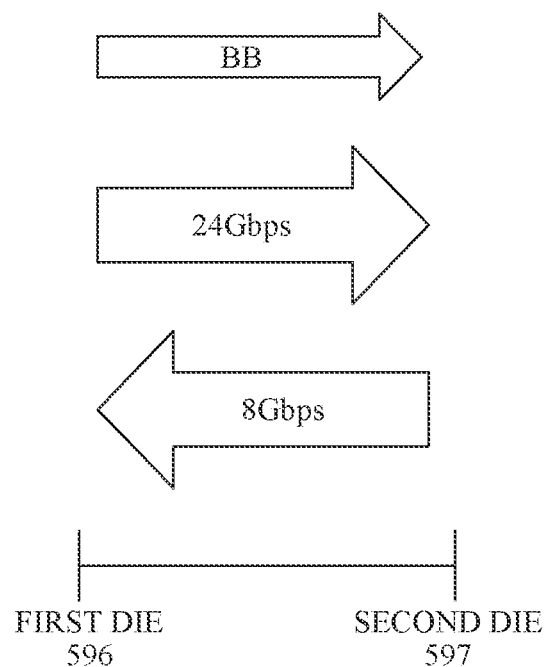

In the first normal mode, the transmission section of the second die 597 transmits the 1-bit timing signal DQSb, the 1-bit data mask DMb, and the four bits of data DQb(1:0) and DQb(3:2) at the same time that the transmission section of the first die 596 transmits the six bits of data 802. In this manner, simultaneous, bidirectional data transmission is achieved between the dies 596, 597. This is illustrated in FIG. 5D, which shows that for the first normal mode, during a given time period, there is a contemporaneous (i) transmission from the first die 596 to the second die 597 at a data rate of 24 Gbps, and (ii) transmission from the second die 597 to the first die 596 at a data rate of 8 Gbps. Further, as described above, the transmission section of the first die 596 transmits the timing signal DQSa and the data mask DMa to the second die 597 at the baseband frequency 502.

It is noted that during the first normal mode, portions of the transceivers disposed on the first and second dies 596, 597 are inactive. These portions are indicated by reference numerals 1002, 1004 in the illustration of FIG. 5C. For example, as noted above, the transmission section of the first die 596 transmits at the carrier frequency 504 and not the carrier frequency 506. Accordingly, portions of this transmission section that are configured to modulate data onto a carrier signal having the carrier frequency 506 are inactive.

Figure 5E:
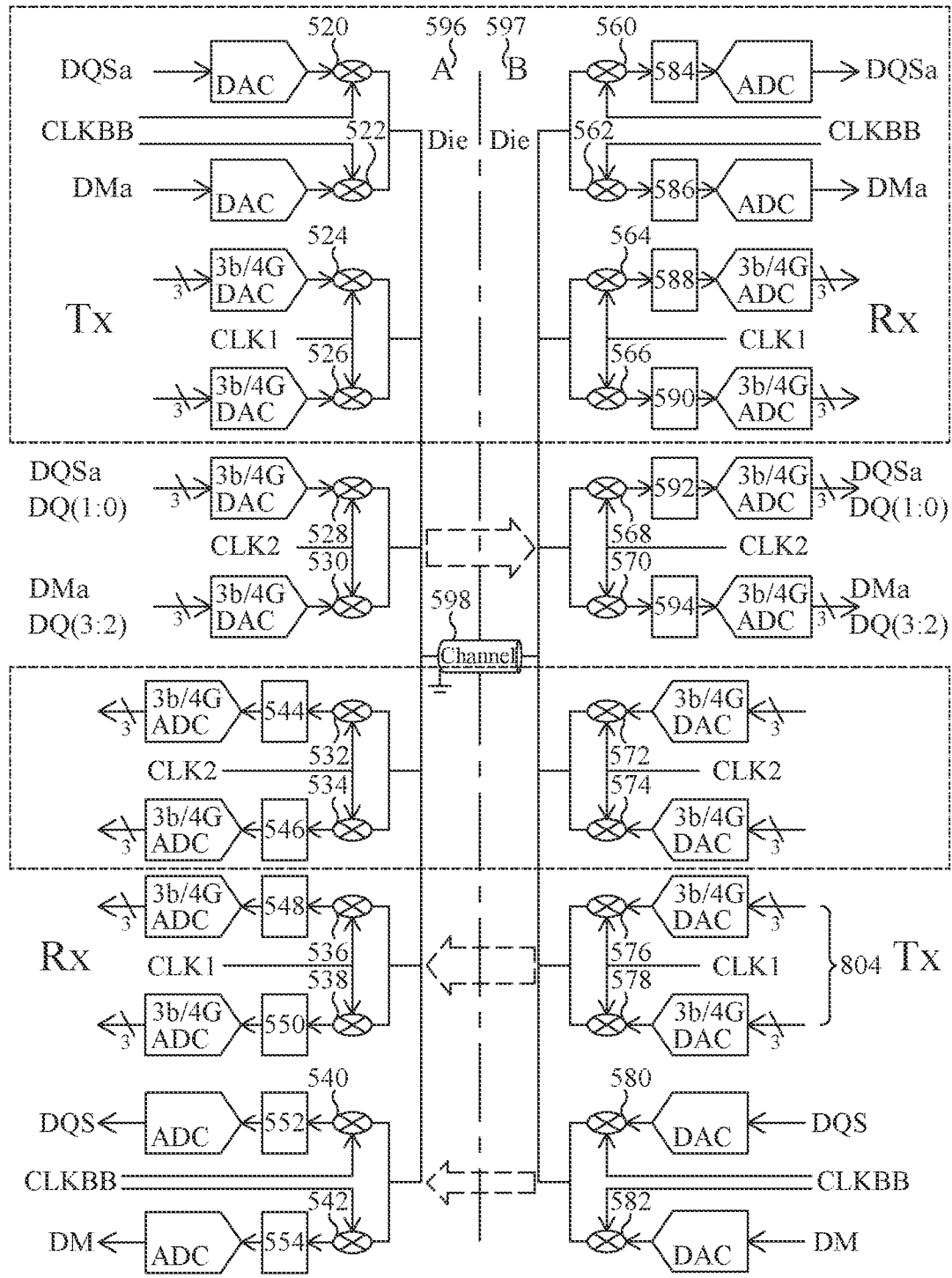
Figure 5F:
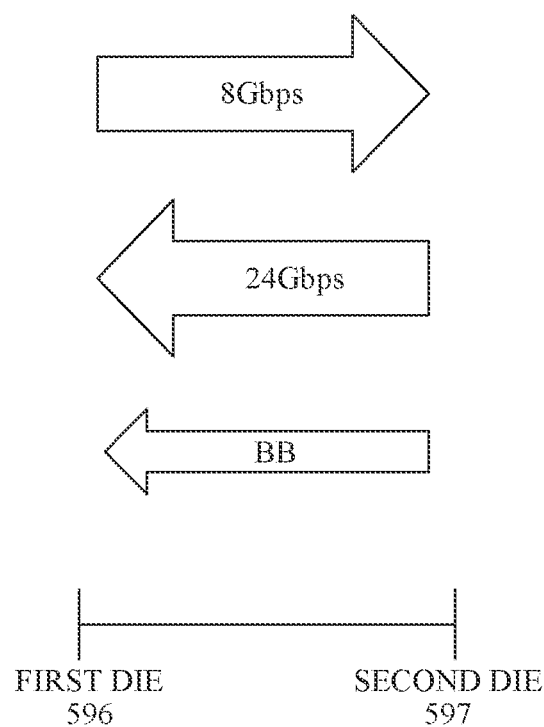

To illustrate a second normal mode, reference is made to FIGS. 5E and 5F. The second normal mode is similar to the first normal mode, except that the data transmissions occur in the opposite direction. Thus, the transmission section of the second die 597 is configured to transmit six bits of data 804 at the carrier frequency 504 (labeled "CLK1") at a total data rate of 24 Gbps. In the second normal mode, the transmission section of the second die 597 is further configured to transmit a timing signal DQS and a data mask DM at the baseband frequency 502 (labeled "CLKBB"). The reception section of the first die 596 utilizes the demodulators 536, 538, 540, 542 and filters 548, 550, 552, 554 to recover the six bits of data 804, the timing signal DQS, and the data mask DM. Further, in the second normal mode, the transmission section of the first die 596 is configured to transmit a 1-bit timing signal DQSa, a 1-bit data mask DMa, and four bits of data DQ(1:0) and DQ(3:2) at the carrier frequency 506 (labeled "CLK2") at a total data rate of 8 Gbps. The reception section of the second die 597 utilizes the demodulators 568, 570 and filters 592, 594 to recover this data.

As shown in FIG. 5F, for the second normal mode, during a given time period, there is a contemporaneous (i) transmission from the second die 597 to the first die 596 at a data rate of 24 Gbps, and (ii) transmission from the first die 596 to the second die 597 at a data rate of 8 Gbps. Further, as described above, the transmission section of the second die 597 transmits the timing signal DQS and the data mask DM to the second die 597 at the baseband frequency 502.

Figure 5G:
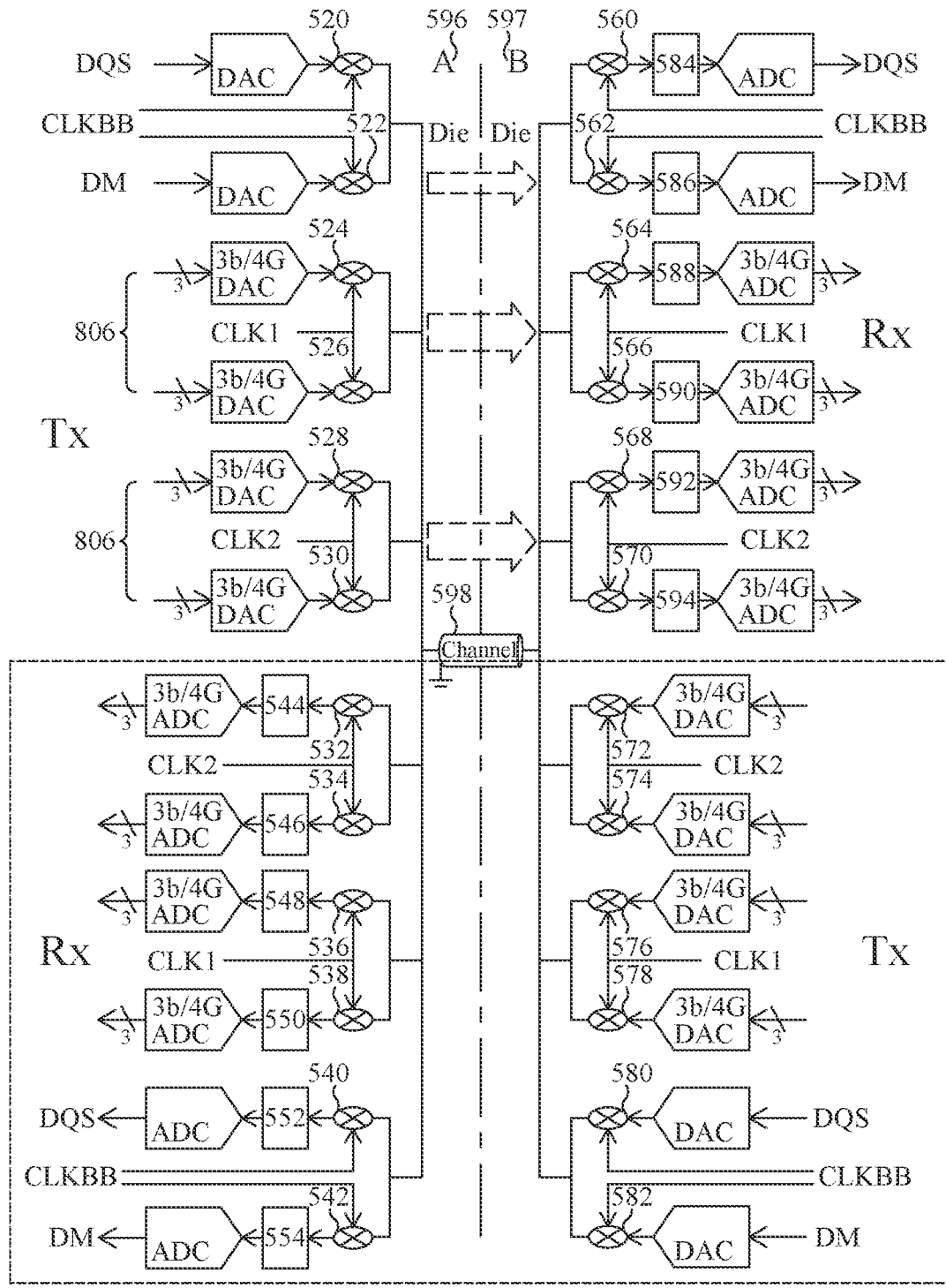
Figure 5H:
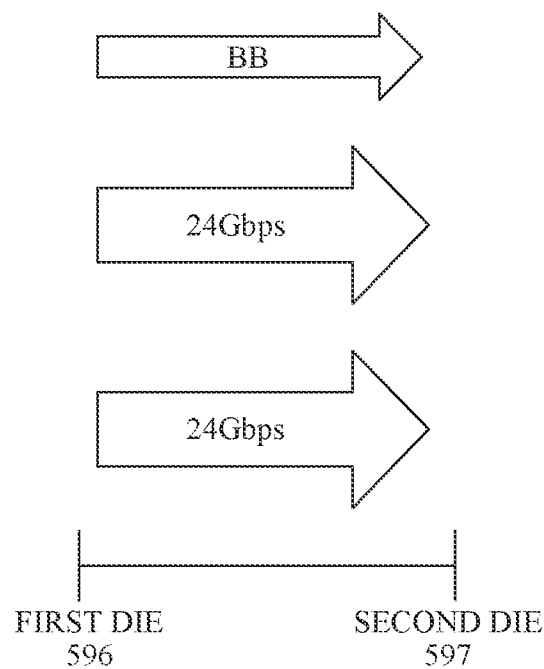

To illustrate a first burst mode, reference is made to FIGS. 5G and 5H. In this mode, the transmission section of the first die 596 is configured to transmit twelve bits of data 806 at the carrier frequencies 504, 506 (labeled "CLK1" and "CLK2," respectively). The transmission section transmits each of the twelve bits of data 806 at a data rate of 4 Gbps, thus enabling a total data rate of 48 Gbps in transmitting this data from the first die 596 to the second die 597. In the first burst mode, the transmission section of the first die 596 is further configured to transmit a timing signal DQS and a data mask DM at the baseband frequency 502 (labeled "CLKBB"). The reception section of the second die 597 utilizes its demodulators and filters to recover the twelve bits of data 806, the timing signal DQS, and the data mask DM.

In the first burst mode, data transmission is unidirectional. This is illustrated in FIG. 5H, which shows that for the first burst mode, during a given time period, there is data transmission from the first die 596 to the second die 597 at a data rate of 48 Gbps and no data transmission from the second die 597 to the first die 596. Further, as described above, the transmission section of the first die 596 transmits the timing signal DQS and the data mask DM to the second die 597 at the baseband frequency 502.

Figure 5I:
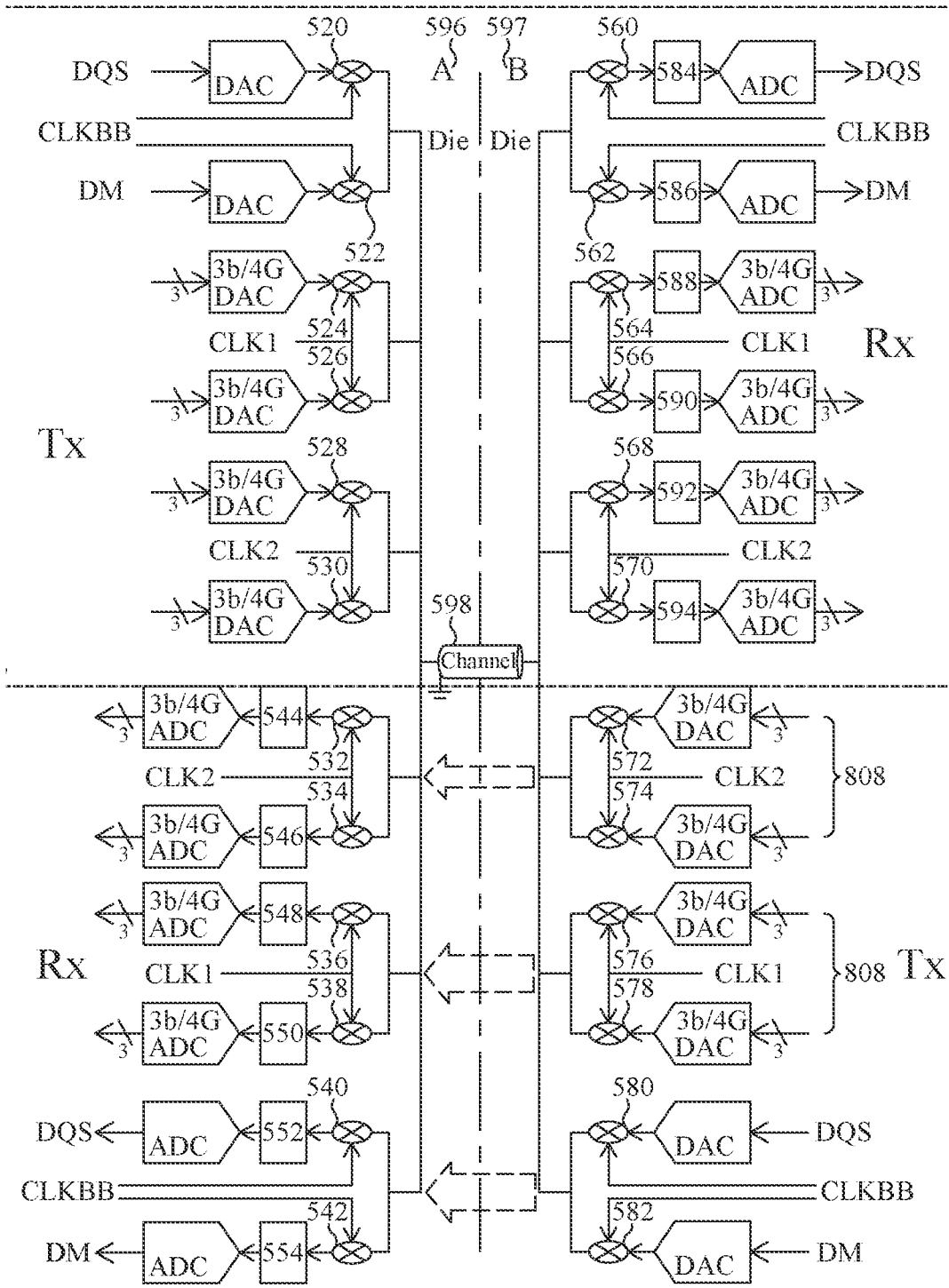
Figure 5J:
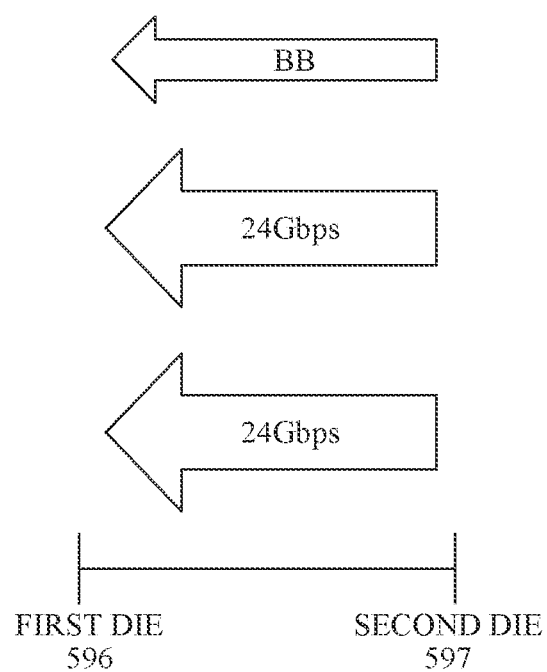

To illustrate a second burst mode, reference is made to FIGS. 5I and 5J. The second burst mode is similar to the first burst mode, except that the data transmissions occur in the opposite direction. Thus, in the second burst mode, the transmission section of the second die 597 is configured to transmit twelve bits of data 808 at the carrier frequencies 504, 506 to achieve a total data rate of 48 Gbps. In the second burst mode, the transmission section of the second die 597 is further configured to transmit a timing signal DQS and a data mask DM at the baseband frequency 502. The reception section of the first die 596 utilizes its demodulators and filters to recover the twelve bits of data 808, the timing signal DQS, and the data mask DM. FIG. 5J illustrates the unidirectional data transmission of the second burst mode.

Figure 6:
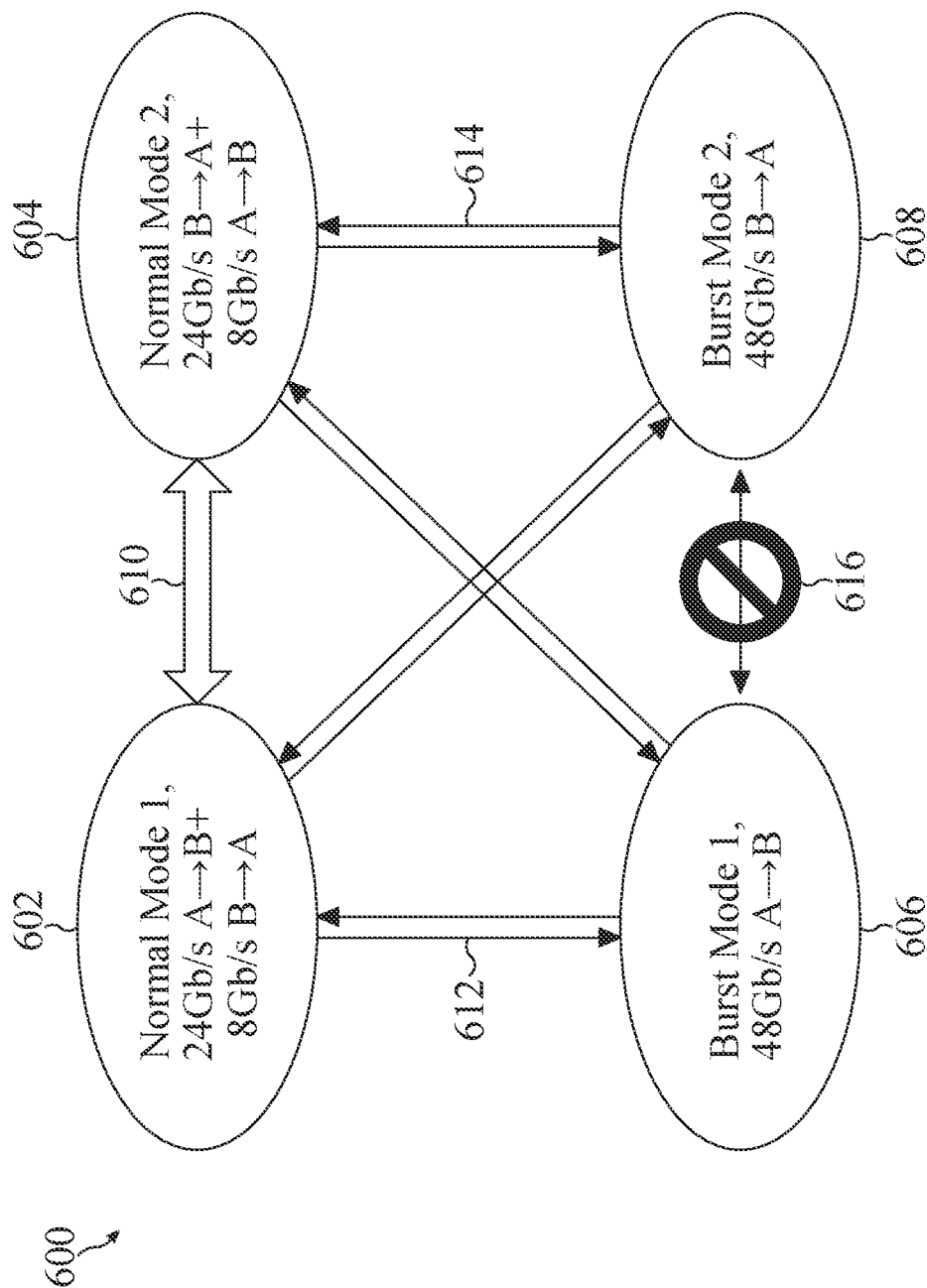
FIG. 6 depicts an example state diagram showing mode transitions for the example die-to-die communication system of FIGS. 5A-5J, in accordance with some embodiments.

FIG. 6 depicts an example state diagram showing mode transitions for the example die-to-die communication system of FIGS. 5A-5J, in accordance with some embodiments. As illustrated in FIG. 6, the die-to-die communication system is configured to operate in the two normal modes 602, 604 and the two burst modes 606, 608, in examples. According to a first rule 610, the die-to-die communication system can transition between the first and second normal modes at any time. According to a second rule 612, the system can transition from a normal mode to a burst mode with defined packet or burst length and action after finished. In other words, according to the second rule 612, if the system is to transition from a normal mode to a burst mode, this can be accomplished by transmitting a pre-defined packet or specified burst length from a first die to a second die. The pre-defined packet or specified burst length is sequential code, in examples. After the transmission of this sequential code at the first die and the reception of this sequential code at the second die, burst mode is enabled. According to a third rule 614, once a burst is finished, the system can transition back to either of the normal modes. In examples, in accordance with the third rule 614, once burst mode is finished, to transition the system back to either normal mode, a pre-defined packet is transmitted (e.g., by the die that is transmitting data during the burst mode). According to a fourth rule 616, the system does not switch between the two burst modes. It is noted that the state diagram depicted in FIG. 6 is only an example, and that in other examples, a different state diagram and/or different rules apply.

Figure 7:
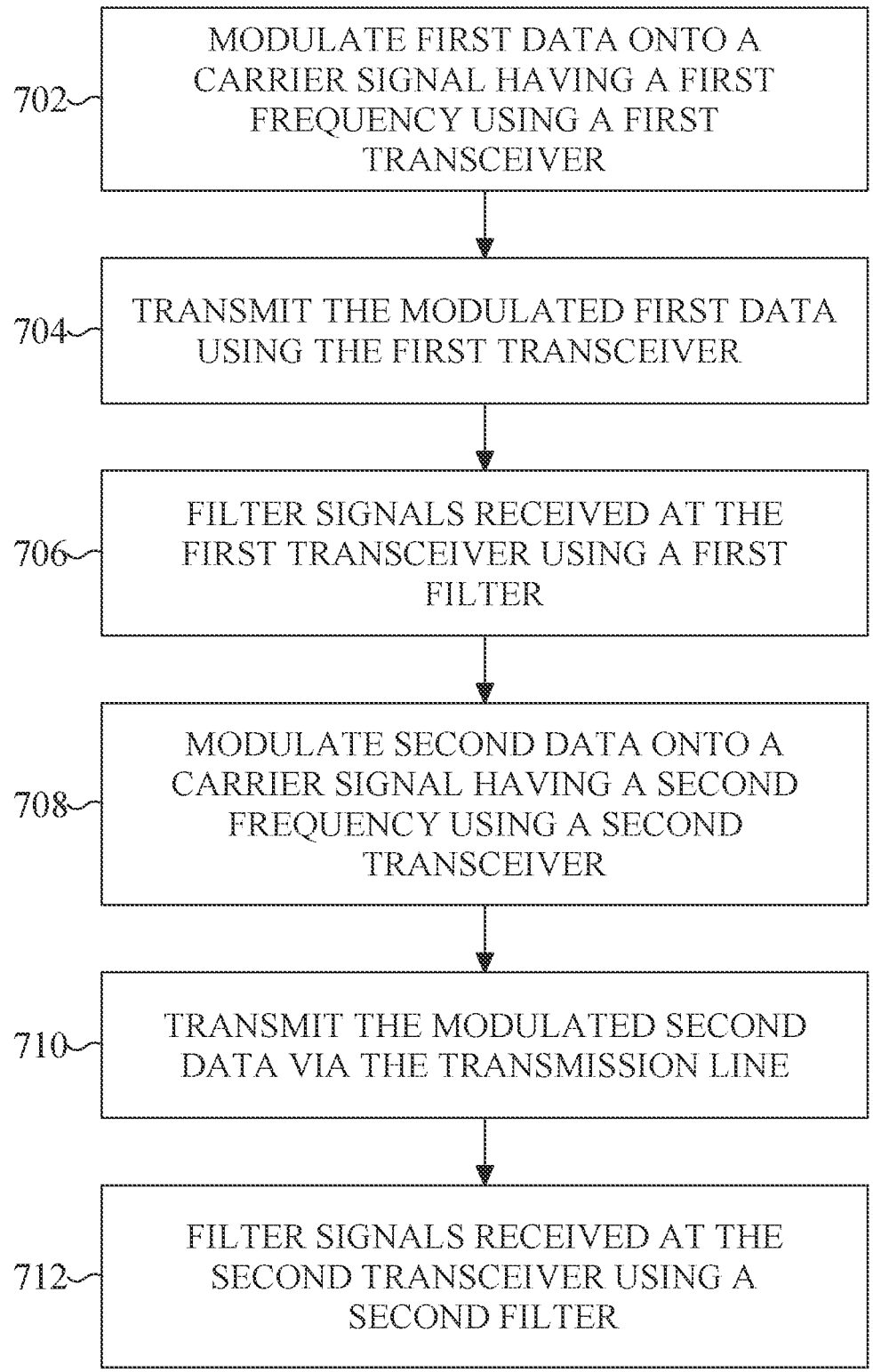
FIG. 7 is a flowchart depicting steps of an example method for communicating data between two dies, in accordance with some embodiments.

FIG. 7 is a flowchart depicting steps of an example method for communicating data between two dies, in accordance with some embodiments. At 702, using a first transceiver disposed on a first die, first data is modulated onto a carrier signal having a first frequency. At 704, using the first transceiver, the modulated first data is transmitted via a transmission line. At 706, signals received at the first transceiver via the transmission line are filtered using a first filter. The first filter is configured to pass frequencies within a first passband that includes a second frequency, and the first frequency is outside of the first passband. At 708, using a second transceiver disposed on a second die, second data is modulated onto a carrier signal having the second frequency. At 710, using the second transceiver, the modulated second data is transmitted via the transmission line. At 712, signals received at the second transceiver via the transmission line are filtered using a second filter. The second filter is configured to pass frequencies within a second passband that includes the first frequency, and the second frequency is outside of the second passband. It is noted that in embodiments, some of the steps 702-712 of FIG. 7 are performed simultaneously and not necessarily sequentially, and that in embodiments, the ordering of the steps 702-712 varies from that depicted in the figure.

A transceiver disposed on a first die in a bidirectional differential die-to-die communication system is disclosed. According to some embodiments, the transceiver includes a transmission section configured to modulate a first data onto a carrier signal having a first frequency for transmission via a bidirectional differential transmission line; and a reception section configured to receive signals from the bidirectional differential transmission line, the reception section including a filter configured to pass frequencies within a first passband that includes a second frequency, the first frequency being outside of the first passband. According to some embodiments, the reception section is configured to receive, via the bidirectional differential transmission line, modulated data at the second frequency at a same time that the transmission section transmits the modulated data at the first frequency. According to some embodiments, the bidirectional differential transmission line is configured to carry the modulated data at the first and second frequencies simultaneously. According to some embodiments, the first and second frequencies are radio frequencies, and the transceiver comprises a radio-frequency (RF) transceiver. According to some embodiments, the bidirectional differential transmission line is configured to carry the modulated first data and a modulated second data simultaneously. According to some embodiments, the modulated first data includes an error detection code or error correction code and payload data. According to some embodiments, the modulated second data includes a resend request, a second transceiver being configured to (i) detect an error in received data based on the error detection code or error correction code, and (ii) transmit the resend request at a same time that the first transceiver transmits the payload data, the resend request being transmitted based on the second transceiver's detection of the error. According to some embodiments, the transmission section of the first transceiver is configured to transmit, via the bidirectional differential transmission line, a timing signal modulated at a third frequency, and a reception section of the second transceiver includes: a second filter configured to pass frequencies within a third passband that includes the third frequency, the second transceiver being configured to receive and process the timing signal to determine a timing of the modulated first data. According to some embodiments, the timing signal is a DQS data strobe signal, and the third frequency is a baseband frequency.

A transceiver disposed on a first die in a bidirectional communication system is disclosed. According to some embodiments, the transceiver includes: a transmission section configured to modulate a first data onto a carrier signal having a first frequency for transmission via a bidirectional differential transmission line; and a reception section configured to receive signals from the bidirectional differential transmission line, the reception section including a filter configured to pass frequencies within a first passband that includes a second frequency, the first frequency being outside of the first passband. According to some embodiments, the reception section is configured to receive, via the bidirectional differential transmission line, modulated data at the second frequency at a same time that the transmission section transmits the modulated data at the first frequency. According to some embodiments, the bidirectional differential transmission line is configured to carry the modulated data at the first and second frequencies simultaneously. According to some embodiments, the first and second frequencies are radio frequencies, and the transceiver comprises a radio-frequency (RF) transceiver. According to some embodiments, the bidirectional differential transmission line is configured to carry the modulated first data and a modulated second data simultaneously. According to some embodiments, the modulated first data includes an error detection code or error correction code and payload data. According to some embodiments, the modulated second data includes a resend request, a second transceiver being configured to (i) detect an error in received data based on the error detection code or error correction code, and (ii) transmit the resend request at a same time that the first transceiver transmits the payload data, the resend request being transmitted based on the second transceiver's detection of the error. According to some embodiments, the transmission section of the first transceiver is configured to transmit, via the bidirectional differential transmission line, a timing signal modulated at a third frequency, and a reception section of the second transceiver includes: a second filter configured to pass frequencies within a third passband that includes the third frequency, the second transceiver being configured to receive and process the timing signal to determine a timing of the modulated first data. According to some embodiments, the timing signal is a DQS data strobe signal, and the third frequency is a baseband frequency.

According to some embodiments, a method for simultaneously and bidirectionaly communicating data between a first transceiver and a second transceiver is disclosed. The method includes: modulating, using the first transceiver disposed on a first die, first data onto a carrier signal having a first frequency; transmitting, using the first transceiver, the modulated first data via a bidirectional differential transmission line; filtering signals received at the first transceiver via the bidirectional differential transmission line using a first filter, wherein the first filter is configured to pass frequencies within a first passband that includes a second frequency, the first frequency being outside of the first passband; modulating, using the second transceiver disposed on a second die, second data onto a carrier signal having the second frequency; transmitting, using the second transceiver, the modulated second data via the bidirectional differential transmission line; and filtering signals received at the second transceiver via the bidirectional differential transmission line using a second filter, wherein the second filter is configured to pass frequencies within a second passband that includes the first frequency, the second frequency being outside of the second passband. According to some embodiments, the method further includes: receiving the modulated first data at the second transceiver, the modulated first data passing through the second filter; and receiving the modulated second data at the first transceiver, the modulated second data passing through the first filter.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A transceiver disposed on a first die in a bidirectional differential die-to-die communication system, the transceiver comprising:
 a transmission section configured to modulate a first data onto a carrier signal having a first frequency for transmission via a bidirectional differential transmission line; and
 a reception section configured to receive signals from the bidirectional differential transmission line, the reception section including two or more filters for selectively passing different, non-overlapping frequency passbands including a first passband including a second frequency and a second passband including a third frequency.

2. The transceiver of claim 1, wherein the reception section is configured to receive, via the bidirectional differential transmission line, modulated data at the second frequency at a same time that the transmission section transmits the modulated data at the first frequency.

3. The transceiver of claim 2, wherein the bidirectional differential transmission line is configured to carry the modulated data at the first and second frequencies simultaneously.

4. The transceiver of claim 1, wherein the first and second frequencies are radio frequencies, and the transceiver comprises a radio-frequency (RF) transceiver.

5. The transceiver of claim 1, wherein the bidirectional differential transmission line is configured to carry the modulated first data and a modulated second data simultaneously.

6. The transceiver of claim 1, wherein the modulated first data includes an error detection code or error correction code and payload data.

7. The transceiver of claim 6, wherein the modulated second data includes a resend request, a second transceiver being configured to (i) detect an error in received data based on the error detection code or error correction code, and (ii) transmit the resend request at a same time that the first transceiver transmits the payload data, the resend request being transmitted based on the second transceiver's detection of the error.

8. The transceiver of claim 7, wherein the transmission section of the first transceiver is configured to transmit, via the bidirectional differential transmission line, a timing signal modulated at a fourth frequency, and wherein a reception section of the second transceiver comprises:
 an additional filter configured to pass frequencies within a third passband that includes the fourth-frequency, the second transceiver being configured to receive and process the timing signal to determine a timing of the modulated first data.

9. The transceiver of claim 8, wherein the timing signal is a DQS data strobe signal, and the fourth frequency is a baseband frequency.

10. A transceiver disposed on a first die in a bidirectional communication system, the transceiver comprising:
 a transmission section configured to modulate a first data onto a carrier signal having a first frequency for transmission via a bidirectional differential transmission line; and
 a reception section configured to receive signals from the bidirectional differential transmission line, the reception section including two or more filters for selectively passing different, non-overlapping frequency passbands including a first passband including a second frequency and a second passband including a third frequency.

11. The transceiver of claim 10, wherein the reception section is configured to receive, via the bidirectional differential transmission line, modulated data at the second frequency at a same time that the transmission section transmits the modulated data at the first frequency.

12. The transceiver of claim 11, wherein the bidirectional differential transmission line is configured to carry the modulated data at the first and second frequencies simultaneously.

13. The transceiver of claim 10, wherein the first and second frequencies are radio frequencies, and the transceiver comprises a radio-frequency (RF) transceiver.

14. The transceiver of claim 10, wherein the bidirectional differential transmission line is configured to carry the modulated first data and a modulated second data simultaneously.

15. The transceiver of claim 10, wherein the modulated first data includes an error detection code or error correction code and payload data.

16. The transceiver of claim 15, wherein the modulated second data includes a resend request, a second transceiver being configured to (i) detect an error in received data based on the error detection code or error correction code, and (ii) transmit the resend request at a same time that the first transceiver transmits the payload data, the resend request being transmitted based on the second transceiver's detection of the error.

17. The transceiver of claim 10, wherein the transmission section of the first transceiver is configured to transmit, via the bidirectional differential transmission line, a timing signal modulated at a fourth frequency, and wherein a reception section of the second transceiver comprises:
 an additional filter configured to pass frequencies within a third passband that includes the fourth frequency, the second transceiver being configured to receive and process the timing signal to determine a timing of the modulated first data.

18. The transceiver of claim 17, wherein the timing signal is a DQS data strobe signal, and the fourth frequency is a baseband frequency.

19. A system for simultaneously and bidirectionally communicating data between a first transceiver and a second transceiver, the system comprising:
 means for modulating, using the first transceiver disposed on a first die, first data onto a carrier signal having a first frequency;
 means for transmitting, using the first transceiver, the modulated first data via a bidirectional differential transmission line;
 means for filtering signals received at the first transceiver via the bidirectional differential transmission line using filters having different non-overlapping, frequency passbands;
 means for modulating, using the second transceiver disposed on a second die, second data onto a carrier signal having the second frequency;

means for transmitting, using the second transceiver, the modulated second data via the bidirectional differential transmission line; and means for filtering signals received at the second transceiver via the bidirectional differential transmission line using filters having different non-overlapping, frequency passbands than the means for filtering signal received at the first transceiver.

20. The system of claim 19, further comprising:

means for receiving the modulated first data at the second transceiver, the modulated first data passing through a filter thereon; and means for receiving the modulated second data at the first transceiver, the modulated second data passing through a filter thereon.

* * * * *